US008232413B2

(12) United States Patent
Cohen et al.

(10) Patent No.: US 8,232,413 B2
(45) Date of Patent: Jul. 31, 2012

(54) PROCESS FOR THE PRODUCTION OF A CRYSTALLINE GLUCAGON RECEPTOR ANTAGONIST COMPOUND

(75) Inventors: Benjamin M. Cohen, Cranford, NJ (US); Daniel J. Kumke, Colts Neck, NJ (US); Lushi Tan, Edison, NJ (US); Aaron S. Cote, West Windsor, NJ (US)

(73) Assignee: Merck Sharp & Dohme Corp., Rahway, NJ (US)

( * ) Notice: Subject to any disclaimer, the term of this patent is extended or adjusted under 35 U.S.C. 154(b) by 248 days.

(21) Appl. No.: 12/675,990

(22) PCT Filed: Sep. 8, 2008

(86) PCT No.: PCT/US2008/010473
§ 371 (c)(1),
(2), (4) Date: Mar. 2, 2010

(87) PCT Pub. No.: WO2009/035558
PCT Pub. Date: Mar. 19, 2009

(65) Prior Publication Data
US 2010/0184995 A1      Jul. 22, 2010

Related U.S. Application Data

(60) Provisional application No. 60/993,587, filed on Sep. 12, 2007.

(51) Int. Cl.
*C07D 231/12* (2006.01)

(52) U.S. Cl. .................................................. 548/377.1
(58) Field of Classification Search ............... 548/377.1
See application file for complete search history.

(56) References Cited

U.S. PATENT DOCUMENTS

| 3,804,653 | A | 4/1974 | Morris et al. |
| 3,892,539 | A | 7/1975 | Midler, Jr. |
| 4,950,586 | A | 8/1990 | Diehl et al. |
| 5,145,684 | A | 9/1992 | Liversidge et al. |
| 5,314,506 | A | 5/1994 | Midler, Jr. et al. |
| 6,634,576 | B2 | 10/2003 | Verhoff et al. |
| 7,572,922 | B2 | 8/2009 | Parmee et al. |
| 7,598,285 | B2 * | 10/2009 | Parmee et al. ............. 514/406 |
| 2004/0091546 | A1 | 5/2004 | Johnson et al. |
| 2006/0160841 | A1 | 7/2006 | Wei et al. |

FOREIGN PATENT DOCUMENTS

WO     2007/015999 A2     2/2007

* cited by examiner

*Primary Examiner* — Joseph Kosack
*Assistant Examiner* — Matthew Coughlin
(74) *Attorney, Agent, or Firm* — Anna L. Cocuzzo; Richard C. Billups; John C. Todaro

(57) ABSTRACT

The present invention relates to a process for the production of crystalline particles of a glucagon receptor antagonist compound. The process includes the steps of generating microseeds and subjecting the microseeds to a crystallization process. The resulting crystalline particles have a mean particle size of less than about 100 mm. The present invention also provides for a pharmaceutical composition which includes the crystalline particles produced by the method described herein and a pharmaceutically acceptable carrier.

14 Claims, 3 Drawing Sheets

PROCESS FOR THE PRODUCTION OF A CRYSTALLINE GLUCAGON RECEPTOR ANTAGONIST COMPOUND

CROSS-REFERENCE TO RELATED APPLICATIONS

This application is a U.S. National Phase application under 35 U.S.C. §371 of PCT Application No. PCT/US2008/010473, filed Sep. 8, 2008, which published as WO 2009/035558 on Mar. 19, 2009, and claims priority under 35 U.S.C. §119 from U.S. Provisional Application No. 60/993,587, filed Sep. 12, 2007.

BACKGROUND OF THE INVENTION

The present invention relates to the production of a crystalline compound that is useful as a glucagon receptor antagonist. The compound is of the formula I:

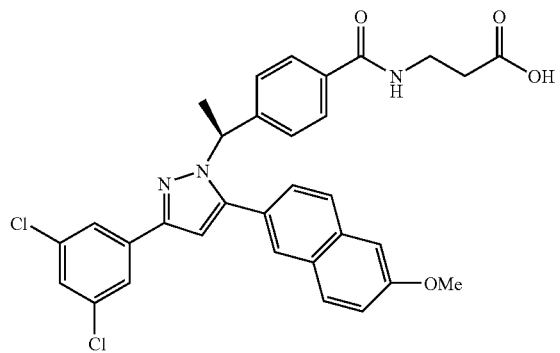

It is useful for treating diabetes, especially type 2 diabetes, and related conditions.

During the production of pharmaceuticals, the formation of solids is most often accomplished by crystallization in the solution phase followed by isolation and drying. The dry active organic compound is typically further processed to reach a particle size profile that is optimal for formulation of the end product. The resultant particle size can vary significantly, in most cases, having a mean size less, than 300 μm.

The formation of a new solid phase by crystallization, from solute dissolved in liquid, is generally accepted to occur by the following pathway: (1) nucleation of new particles and (2) growth through deposition of solute on existing particles. Nucleation can occur on foreign substances in a crystallizer or homogeneously from solution. U.S. Pat. No. 5,314,506 entitled "Crystallization method to improve crystal structure and size" and U.S. Published Patent Application No. 2004/0091546 A1 entitled "Process and apparatuses for preparing nanoparticle compositions with amphiphilic copolymers and their use" describe small particles, even nanoparticles, produced by massive nucleation of many new particles of the solute during precipitation. In these processes, the character of the system is changed using solvent composition and temperature of reaction, to create high supersaturation for the solute which in turn leads to rapid nucleation and crystallization. The birth of many particles by nucleation leads to a small particle size distribution at the end of the crystallization step, thereby obviating the need for dry milling.

However, under supersaturation conditions, undesirable solid state forms, such as molecular packings in a crystal, can be produced. In addition, crystals with occluded solvent molecules or impurities, may be produced, requiring further purification.

In an effort to control the morphologic properties of the final product, it is desirable to use seed particles of the product to provide a template for crystal growth during crystallization. Seeding helps control the particle size, crystal form, and chemical purity. Various milling techniques have been employed to generate the seed stock. Dry milling has been used routinely to generate small particles for crystallization seed that result in particles of moderate size. This approach does not eliminate the previously discussed engineering and safety concerns associated with dry milling and is less desirable than a wet milling technique for seed generation.

Rotor-stator wet milling can be used to generate relatively large seed particles with a practical limit of greater than about 20 μm. On the other hand, milling to this size requires extended milling time in the attrition regime where small fragments lead to a bimodal particle size distribution (American Pharmaceutical Review Vol 7, Issue 5, pp 120-123, "Rotor Stator Milling of API's . . . "). It has been found that crystallizations using rotor-stator wet milled products as seed result in large particles and, most often, a bimodal particle size distribution. A subsequent dry milling step is required to create the desired small sized crystals or monomodal material.

Sonication is another technique for generating large seeds for crystallization. Sonication has been shown to yield product greater than about 100 μm (See U.S. Pat. No. 3,892,539 entitled "Process for production of crystals in fluidized bed crystallizers").

Media milling has recently been used to create final product streams for direct formulation of pharmaceuticals with particulates less than about 400 μm (See U.S. Pat. No. 5,145,684). A review of media milling and its utilities is described in U.S. Pat. No. 6,634,576.

U.S. Pat. No. 3,804,653 relates to media that is formulated of sand, beads, cylinders, pellets, ceramic or plastic. The mill can be formulated of metal, steel alloy, ceramic and that the mill may be lined with ceramic. Plastic resin including polystyrene is noted as being particularly useful. U.S. Pat. No. 4,950,586 relates to the use of zirconium oxide beads to mill organic dyes to below 1μ in the presence of stabilizers. In one embodiment of the present invention, ceramic beads and a ceramic mill are utilized. In a further embodiment, ceramic beads and a chromium-lined mill are utilized.

In the present invention, wet milled micro-seed with a mean particle size ranging from about 0.1 to about 20 μm has been shown to be surprisingly effective for the production of particles of Formula I with a controlled particle size distribution, crystal form, and purity. Further advantages of the present invention include the elimination of the need for downstream dry milling, thereby eliminating the health and safety hazards often associated with these processes.

SUMMARY OF THE INVENTION

The present invention provides a process for the production of substantially uniform crystalline particles of a compound of the formula I:

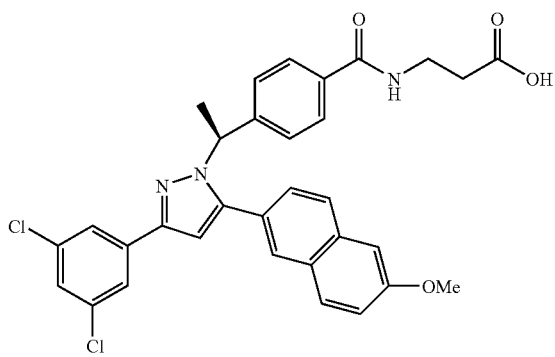

comprising:
generating microseeds of the compound of formula I, and crystallizing the compound of formula I on the microseeds from a suitable solvent or solvent mixture in the presence of ultrasonic energy to produce the compound in the form of substantially uniform crystalline particles.

BRIEF DESCRIPTION OF THE DRAWINGS

The invention is described in connection with the figures appended hereto.

DETAILED DESCRIPTION OF THE INVENTION

Figure 1:
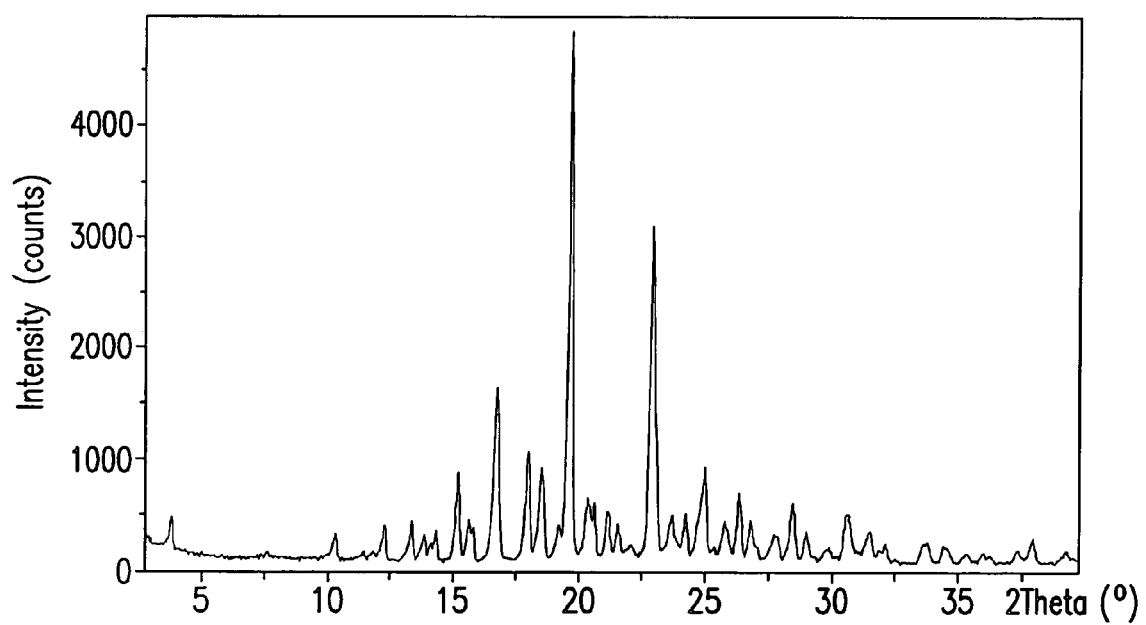
FIG. 1 is the X-ray diffraction pattern of the crystalline anhydrous free acid of Compound I. The crystalline anhydrous free acid exhibited characteristic reflections corresponding to d-spacings of 5.3, 4.5, and 3.9 angstroms. The crystalline anhydrous free acid was further characterized by reflections corresponding to d-spacings of 7.2, 4.9 and 4.8 angstroms. The crystalline anhydrous free acid was even further characterized by reflections corresponding to d-spacings of 5.8, 3.8, and 3.4 angstroms. X-ray powder diffraction studies are widely used to characterize molecular structures, crystallinity, and polymorphism. The X-ray powder diffraction patterns of the crystalline anhydrous free acid of the present invention were generated on a Philips Analytical X'Pert PRO X-ray Diffraction System with PW3040/60 console. A PW3373/00 ceramic Cu LEF X-ray tube K-Alpha radiation was used as the source.
Figure 2:
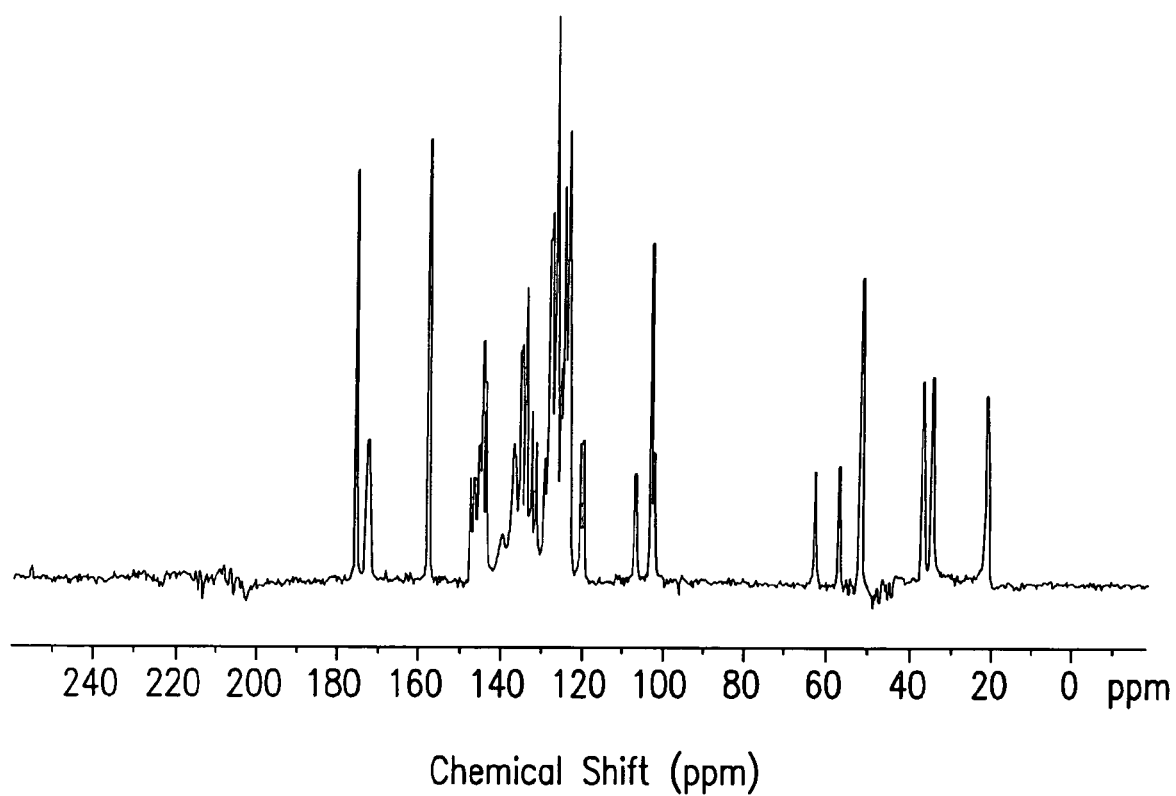
FIG. 2 is a solid state carbon-13 cross-polarization magic-angle spinning (CPMAS) nuclear magnetic resonance (NMR) spectrum of the crystalline anhydrous free acid of compound I. The compound I exhibited characteristic signals with chemical shift values of 51.7, 157.8, and 175.6 p.p.m. Further characteristic of the crystalline anhydrous free acid of compound I are the signals with chemical shift values of 37.1, 103.1 and 126.6 p.p.m. The crystalline anhydrous free acid of compound I is even further characterized by signals with chemical shift values of 106.9, 134.0, and 143.7 p.p.m. The crystalline anhydrous free acid of compound I was characterized by solid-state carbon-13 nuclear magnetic resonance (NMR) spectra, obtained on a Bruker Avance 400 NMR system using a Bruker 4 mm H/X/Y CPMAS probe. The carbon-13 NMR spectra utilized proton/carbon-13 cross-polarization magic-angle spinning with variable-amplitude cross polarization, total sideband suppression, and SPINAL decoupling at 100 kHz. The samples were spun at 8.0 kHz, and a total of 4096 scans were collected with a recycle delay of 10 seconds. A line broadening of 10 Hz was applied to the spectra before FT was performed. Chemical shifts are reported on the TMS scale using the carbonyl carbon of glycine (176.03 p.p.m.) as a secondary reference.

One aspect of the process described herein includes the step of generating microseeds by a wet-milling process and subjecting the microseeds to a crystallization process. The microseeds generated by the wet milling process have a mean particle size of about 0.1 to about 20 μm. The resulting crystalline particles which are produced in the presence of ultrasonic energy have a mean particle size of less than about 100 μm.

With respect to the crystallization step, the present invention the following crystallization method, which utilizes a two-step process: generating a slurry of the microseeds using media milling; and crystallizing the active organic compound on the microseeds.

A recycle loop may also be used in conjunction with the crystallization process. Additionally, a supplemental energy device may be used in conjunction with the crystallization process.

In a first embodiment, this supplemental energy device is a mixing tee; in a second, it is a mixing elbow; in a third it is a static mixer; in a fourth, it is a sonicator; and, in a fifth, it is a rotor-stator homogenizer. Preferably the supplemental energy device is a sonicator.

The crystallization method may use two types of solvent streams. In one embodiment, the solvent system is an aqueous solvent stream; in another, the solvent system is an organic solvent stream; in yet another, the solvent system is a mixed solvent stream.

The micro-milling and crystallization process of the present invention comprises growth on microseed particles to a mean volume particle size less than about 100 μm, such as for example, less than about 60 μm, further still less than about 40 μm. In most cases the product will range from about 3 to about 40 μm depending on the amount of seed added for crystallization. The microseed can range from about 0.1 to about 20 μm, for example, from about 1 to about 10 μm by mean volume analysis. The seed can be generated by a number of wet milling devices, such as for example, media milling. Particles having a mean particle size of less than about 1 μm may also be utilized. However, this size range is less attractive than microseed because the resulting particle sizes if the particles are kept dispersed during a growth crystallization are smaller than desired for conventional isolation techniques using typical seed levels of about 0.5% to about 15%.

The process of the present invention comprises generating a slurry of the microseeds and generating a solution containing the product to be crystallized. These two streams are combined to provide crystallization of the product. In most cases, the crystallization is continued by manipulating changes in product solubility and concentration in order to drive the crystallization. These manipulations lead to a supersaturated system which provides a driving force for the deposition of solute on the seed. The level of supersaturation during the seeding event and the subsequent crystallization is controlled at a level to enhance growth conditions versus nucleation. In the present invention, the process is designed to facilitate growth on the microseed while controlling the birth of new particles. A review of the methods for crystallization including a discussion of growth and nucleation process conditions is provided by Price (Chemical Engineering Progress, September 1997, P34 "Take Some Solid Steps To Improve Crystallization").

The microseed and product particles of the process of the present invention have a number of specific advantages. The microseed particles have a high surface area to volume ratio and thus the growth rate, at a given supersaturation, is enhanced significantly relative to large seed particles. A high population of seed particles avoids nucleation on foreign substances and the crystallization is one of growth on the existing seed particles at low supersaturation. Thus, the size and form of the particles are controlled by the characteristics of the seed particle.

Generally, operating at reactor conditions where the desired crystal form is the most stable and seeding with the desired crystal form is preferred. It has been discovered that small particles have less sensitivity to particle attrition by shear since the particle-particle impacts are between objects of significantly less weight. Starting with monomodal seed, the process of the present invention provides a monomodal particle size distribution as confirmed by optical micrographs and laser scattering techniques. Due to the monodisperse particle size of the resultant product, it is amenable to downstream filtration and formulation making the composite process an attractive method for fine particle finishing.

Any method of generating supersaturation to promote growth in the presence of the microseed is amenable to this invention. Preferably methods to manipulate crystallization include changes in solvent composition and temperature The addition of the micro-seed to the solute or the solute to the micro-seed can be accomplished in several ways including batch crystallization, semi-batch crystallization or semi-continuous crystallization. Preferably, semi-batch crystallization is utilized. Additionally, a combination of these methods can be utilized.

Batch crystallization typically includes crystallizations where the temperature is changed or solvent is removed by distillation to generate the supersaturation. A semi-batch crystallization typically includes the continuous addition of a solvent or reagent to a reservoir of solute or the reaction precursor for the solute. In batch and semi-batch crystallization, the seed is typically added to a reservoir of solute which is supersaturated at the time of seed addition or as a result of the seed addition.

In the process of the present invention, wet milling to micro-seed size is useful to limit the need for dry-milling in a downstream production process. Only select machines can provide particles of a mean optimum size ranging from about 1 to about 10 μm. Milling methods such as high energy hydrodynamic cavitation or high intensity sonication, high energy ball or media milling, and high pressure homogenization are representative of the technologies that can be utilized to make micro-seed having a mean optimum size ranging from about 1 to about 10 μm.

In one embodiment of the invention media milling is an effective wet milling method to reduce the particle size of seed to the target size. In addition, media milling has been found to maintain the crystallinity of the compound upon milling, and is useful to prepare microseed. The size of the media beads utilized ranges, for example, from about 0.5 to about 4 mm.

Additional parameters that can be changed during the wet milling process of the invention, include product concentration, milling temperature, and mill speed to afford the desired micro-seed size.

Crystallizations from the current invention are most predictable when a substantially disperse seed is utilized for crystallization. Using aggregates of particles as seed is less desirable since the number and size of the aggregates could be variable.

Since the process of the present invention is primarily one of growth on existing seed particles, the amount and size of micro-seed is the primary determinant of the API particle size. Variable amounts of seed can be added to afford the desired particle size distribution (PSD) after crystallization. Typical seed amounts (material not dissolved in the solvent phase of the seed slurry) range from about 0.1 to 20 wt % relative to the amount of the active ingredient to be crystallized. Preferably, seed amounts range from about 1-10%, more preferably about 2-5%, and even more preferably about 5% relative to the weight of the crystalline solids. In a growth crystallization, introduction of less seed leads to larger particles. For example, low amounts of seed can increase the product particles size above 60 μm, but the crystallization could potentially be very slow to avoid nucleation and promote growth on those seeds. Seed levels of about 0.5 to 15% are reasonable charges starting with micro-seed of 1 to 10 μm.

In one embodiment, the process comprises:

(1) wet milling to generate micro-seed of the compound of formula I having a mean size of approximately 0.1 to 20 μm; and (2) crystallizing the compound of formula I on the micro-seed to yield crystalline particles of the compound of formula I having a mean size less than about 100 μm.

The dissolution process may comprise heating and changes in solvent composition. The process of the current invention is highly scalable. Proper equipment design at each scale may enable robust performance. Two features that may be employed for reliable scale up: 1) rapid micro-mixing during additions of materials to an actively crystallizing system and 2) inclusion of an energy device for particle dispersion of unwanted agglomeration. Crystallizer designs containing these features are amenable for scale-up of the invention. Rapid micro-mixing implies a fast mixing time of the two streams at the molecular level relative to the characteristic induction time for crystallization of the product. These concepts are explained in detail by Johnson and Prud'homme (Australian Journal of Chemistry 56(10): 1021-1024 (2003)) and by Marcant and David (AIChE Journal November 1991 vol 37, No 11). Both groups of authors stress that the micro-mixing time can affect the outcome of a crystallization or precipitation. Accordingly, the authors emphasize that a low micro-mixing time is advantageous. For solvent, concentrate, or reagent additions, this rapid micro-mixing reduces or eliminates concentration gradients that could lead to a nucleation event.

In another aspect of the invention, supersaturation is kept low to promote growth on the micro-seed. In some cases, the kinetics of crystallization are fast and nucleation cannot be substantially avoided. An appropriate rapid mixer should be chosen in these cases to limit nucleation by mixing reagent streams quickly and avoiding high local concentrations of reagents. When the micro-seed is added to a crystallizer containing solute, dispersion of the seed by rapid micro-mixing is important to limit agglomeration of the micro-seed as crystallization takes place. Additionally, agglomeration of particles is directly related to the level of local supersaturation. Hunslow (Chemical Engineering Transactions, "Proceedings of the 15th International Symposium on Industrial Crystallization 2002", Volume 1 2002, p 65, published by ADIC—*Associazione Italiana Di Engegneria Chemi*). Therefore, rapid micro-mixing is also helpful in minimizing agglomeration for this situation. The selection of a rapid mixer must be balanced against the level of particle attrition by the choice of the mixer. The mechanism leading to particle birth due to particle—particles or particles—crystallizer surface interactions in the presence of seed particles is commonly referred to as secondary nucleation and is expected to occur to some extent in most crystallizations. The choices of equipment can alter the extent of this effect.

In general, the energy density experienced by the particles must be sufficient to afford deagglomeration and the particles must be exposed to the energy density during crystallization at a frequency sufficient to maintain a disperse system. A supplemental energy device helps to minimize agglomeration by dispersing particles. A function of the energy device is to create particle collisions which break lightly agglomerated materials apart or create a shear field which torque and break the agglomerates. This energy device could be as simple as a properly designed tank agitator or a recycle pipe with fluid pumping through it. Fluid pumps are high energy devices and can affect the crystallization process. These devices are sufficient when aggregates and agglomerates are not strong or the product is exposed to the device frequently. Rotor stator wet-mills are useful to provide a strong shear environment and are most useful when the particles themselves are not attritted. Sonication or ultrasonic energy applied to the crystallizer, has been found to limit agglomeration of compounds that aggregate readily and form stronger agglomerates. Applying sonication or an energy device at the end of the crystallization can also be useful to break agglomerates, but is less desirable than during the crystallization since the agglomerates may be of significant strength by the end of the crystallization time.

The fundamental technology of sonication (ultrasound waves typically between 10 and 60 kHz) is highly complex and the fundamental mechanism for successful deagglomeration is unclear. Sonication is effective at deaggregation or deagglomeration (Pohl and Schubert Partec 2004 "dispersion and deagglomeration of nanoparticles in aqueous solutions"). As a nonbinding explanation of the mechanical process, sonication provides ultrasound waves of a high power density and thus a high strength for agglomerate disruption. Cavitation bubbles are formed during the negative-pressure period of the wave and the rapid collapse of these bubbles provide a shock wave and high temperature and pressures useful for deagglomeration. In the present invention, it has been found that the seed and grown particles are not significantly fractured in most cases, and thus, the high energy events of sonication are especially effective to promote growth on dispersed particles without attrition of the particles.

Ultrasound reduces the induction time for nucleation and provides facile nucleation at moderate supersaturation. This enhances the reproducibility of seed bed generation in the absence of solids apriori or without needing to add a solid seed to the batch concentrate (McCausland et. al. Chemical Engineering Progress July 2001 P 56-61). This approach is contrary to the current teachings where the presence of micro-seed dictates the final product properties and especially the crystal form. In the present process, micro-seed is provided and not induced through the application of ultrasound.

The application of sonication to pharmaceutical crystallization for the purpose of controlled growth on disperses microseed particles is unique. In addition, the sonication power required for successful deagglomeration as demonstrated in the current invention is relatively small, less than about 10 watts per liter of total batch at the end of crystallization and preferably less than about 1 watt per liter of total batch at the end of crystallization. The design of equipment for sonication and research into the technology is an active area of research. Examples of flow cells amenable to the present invention are commercially provided by several manufactures (e.g., Branson and Telsonics) for use in recycle loops as an energy device.

The use of a recycle loop to provide methods for micro-mixing and methods to incorporate a supplemental energy device has been shown to be especially advantageous for scale up. The primary concept is to relieve the micro-mixing and energy input demands from a conventional crystallizer (typically a stirred tank) and create specialized zones of functionality. The stirred tank crystallizer can serve as a blending device, with micro-mixing and supplemental energy input to the system independently controlled external to the tank. This approach is an example of a scalable crystallization system for large scale production.

Micro-mixing is best accomplished by adding a stream into a region of high energy dissipation or high turbulence. Addition of the stream into the center of the pipe into a region of turbulent flow in a recycle loop is one embodiment. In this case, a velocity of at least 1 m/s is recommended for conventional pipe flow, but not essential provided the micro-mixing is fast. This example is not limiting for the location of reagent addition and method of reagent addition is critical to achieving proper micromixing. The concepts of mixing in pipelines and in stirred vessels are described in *The Handbook of Industrial Mixing* (Ed. Paul, et al., 2004, Wiley Interscience).

The recycle rate for the crystallizer can be quantified by the time to pass the equivalent of one volume of the batch at the end of the crystallization through the recycle loop, or the turnover time at the end of the crystallization. The turnover time for a vessel can be varied independently and will be a function of the frequency at which the batch should be exposed to the supplemental energy device to limit the agglomeration of the product. A typical turnover time for large scale production ranges from about 5 to about 30 minutes, but this is not limiting. Since the agglomeration of the product crystals typically requires deposition of mass by crystallization, the rate of crystallization can be slowed to extend the turnover time required to afford deagglomeration.

In measuring particle size, care must be taken to select the correct measuring tool. MeanMean particle size may be measured using conventional laser light scattering devices. Specifically, the analysis of dry product is preferred in a machine similar to the Sympatec Helos machine with 0.3 to 1 atm pressure.

Post processing of the compound of formula I into a pharmaceutical dosage form is typical, and is best accomplished when the compound is in the form of substantially uniform crystalline particles. Pharmacokinetics of the resulting dosage form can also be more uniform when the compound is substantially uniform crystalline material As used herein, the terms "crystallization" and/or "precipitation" include any methodology of producing particles from fluids; including, but not limited to, classical solvent/antisolvent crystallization/precipitation; temperature dependent crystallization/precipitation; "salting out" crystallization/precipitation; pH dependent reactions; "cooling driven" crystallization/precipitation; crystallization/precipitation based upon chemical and/or physical reactions, etc.

As used herein, the terms "solvent" and "anti-solvent" denote, respectively, those fluids in which a substance is substantially dissolved, and a fluid which causes the desired substance to crystallize/precipitate or fall out of solution. The anti-solvent is typically miscible with the solvent and is useful for causing supersaturation of the solute in the solvent, driving crystallization of the active.

Micro-seed refers to crystalline material in the range of about 0.1 to about 20 μm. Micro-mixing and micro-milling refer to mixing and milling, respectively, at the micro scale (as opposed to the nano scale). These terms are defined in The Handbook of Industrial Mixing (Ed. Paul, et al. 2004) Wiley Interscience.

Ultrasonic energy refers to energy waves in the range of about 18 kHz to about 100 kHz. Ultrasonic energy is emitted by a Sonicator. Examples of suitable Sonicators have been provided.

The following examples provide a non limiting description of methods to exercise the process of the present invention.

Preventative Example

Synthesis of Compound I

The compound of formula I can be prepared in accordance with any of the following published patent applications: WO2004/069158A2 published on Aug. 19, 2004, WO2005/121097 published on Dec. 22, 2005, and WO2007/015999 published on Feb. 8, 2007. Briefly, the compound of formula I may be prepared according to the following general synthetic schemes.

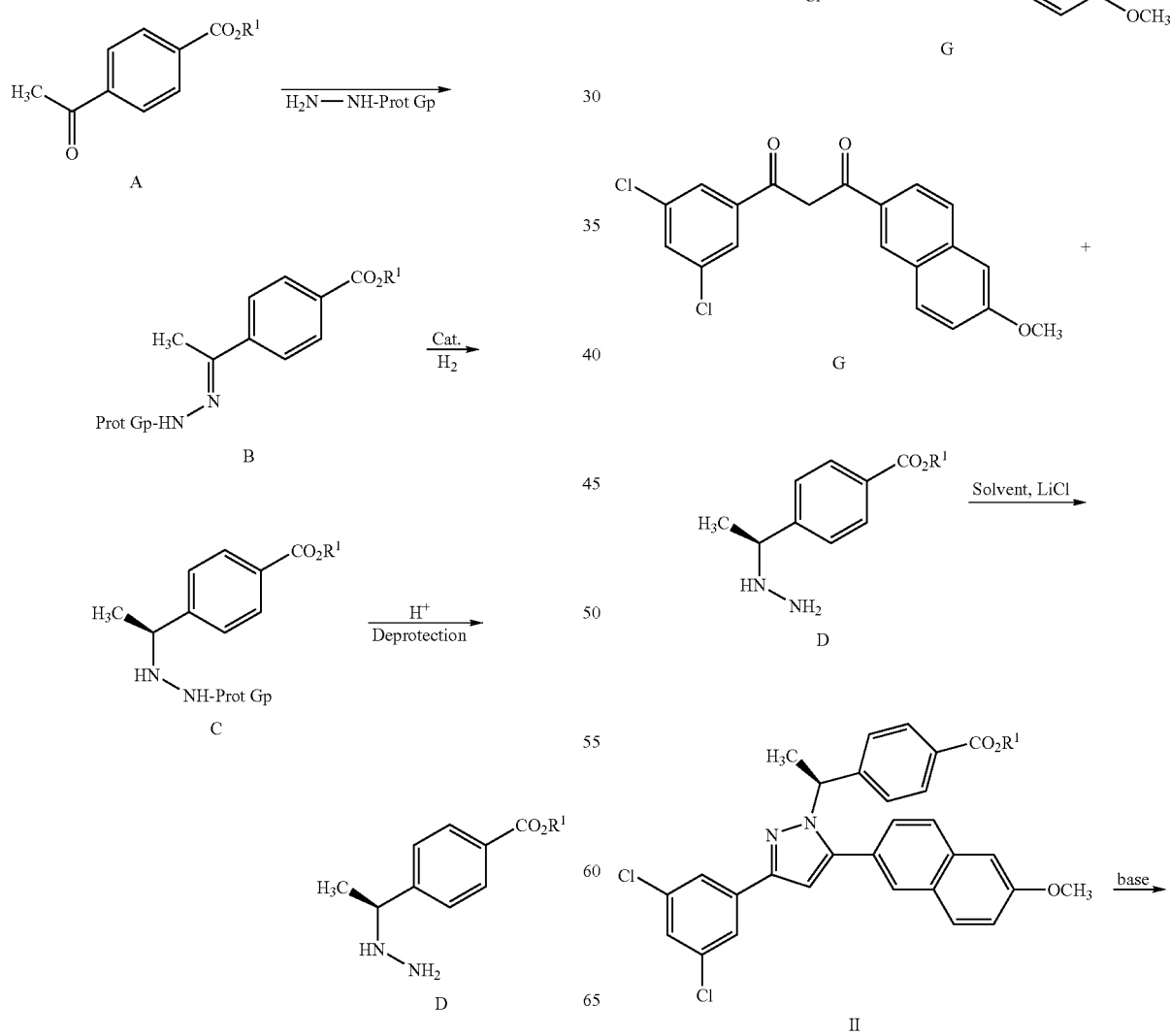

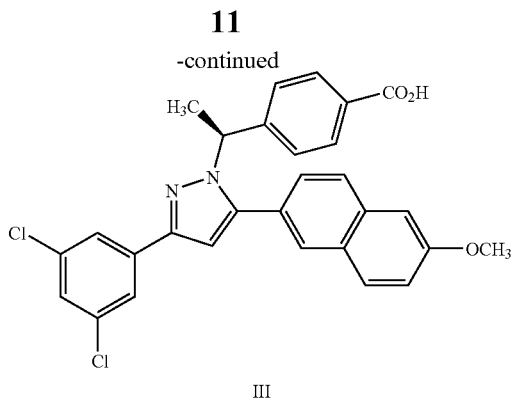

III

SCHEME 3

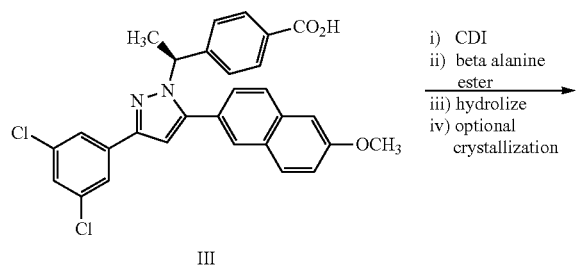

i) CDI
ii) beta alanine ester
iii) hydrolize
iv) optional crystallization

Within the schemes above, R¹ represents a suitable ester forming group. Examples include $C_{1-10}$ alkyl, such as ethyl, isopropyl, t-butyl, t-butylcyclohexyl and the like, and benzyl. Preferred is ethyl.

Similarly, the notation Prot Gp-hydrazine refers to a protected hydrazine, protected with a suitable protecting group, designated Prot Gp, which represents the protecting group. Examples include t-butoxycarbonyl, methoxycarbonyl, carboxybenzoyl, benzyl and the like.

The process described herein is generally considered a stereospecific synthesis. Ketone A is condensed with a protected hydrazine to produce a protected hydrazone B. This condensation reaction is conducted in a suitable solvent, such as toluene, under acidic conditions, with for example, acetic acid, at about 60 degrees C.

The protected hydrazone B is asymmetrically hydrogenated using a hydrogen source, such as hydrogen gas, and a catalyst to produce a chiral N-protected-hydrazine C. This hydrazine is produced in enantiomeric excess (approximately 86% ee). A suitable catalyst for this conversion is a precatalyst, such as $Rh(COD)BF_4$ mixed with a suitable ligand, such as Josiphos™.

Deprotection of the protecting group in C and subsequent enantiomeric excess upgrade using benzene sulfonic acid in ethanol provides a crystalline hydrazine D as the benzenesulfonate salt (not shown), with greater than 99% enantiomeric excess.

With reference to Scheme 2, the 1,3-dione G is prepared by condensation of ester E and ketone F in the presence of a base, such as potassium t-butoxide. Cyclization between D and G can then be undertaken in a suitable solvent, such as DMAc, NMP and the like, in the presence of an additive. Suitable examples of additives include LiCl, LiBr, $MgBr_2$ and other Lewis acids. Alternatively, tetrabutyl ammonium chloride can be used. The additive provides high regioselectivity, as high as about 17:1. The ester forming moiety of compound II is thereafter hydrolyzed with a suitable base, for example, NaOH, to produce acid III.

As shown with reference to Scheme 3, acid III can then be combined with a beta alanine ester, or a salt or solvate thereof, preferably the HCl salt, to form the beta alanyl ester of III (not shown). This ester may then be hydrolyzed, such as with additional base, for example, NaOH, and optionally crystallized, such as from acetonitrile and water, to produce the title compound I as a free acid.

Example 1

Preparation of Microseed

Microseed is prepared using a MiniCer media mill A 17% slurry was formed using the compound of formula I (4.31 kg) and a 50:50 mixture of solvents heptane/isopropyl acetate (IPAC).

The media mill was charged with 1 mm yttrium stabilized Zr beads, and with the slurry. The impeller was run at 2208 rpm and the compound was milled for 54 hrs, at a temperature of 15-25° C.

Figure 3:
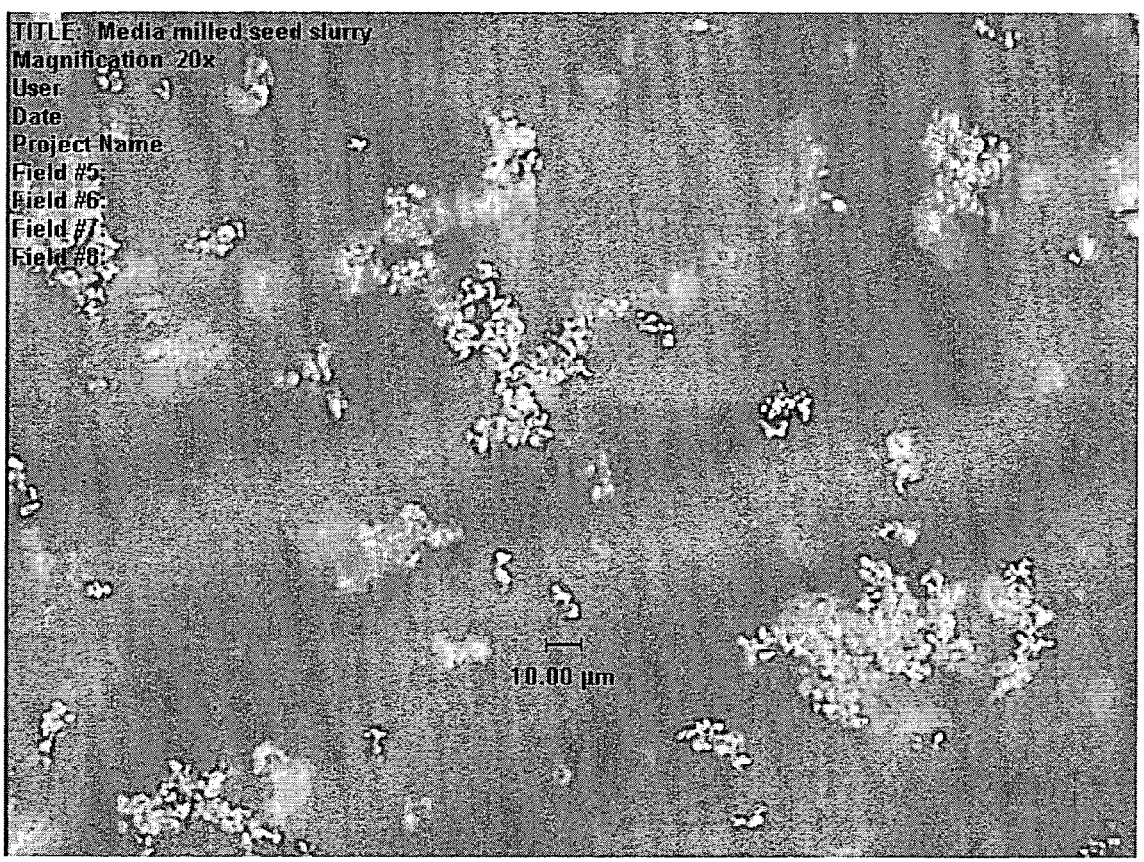
FIG. 3 is a photomicrograph of media milled seed slurry at 20× magnification through a light microscope.

The microseed produced as described above has an average particle size of about 1-3 μm, and an appearance as shown in FIG. 3.

Preparation of Crystalline Compound of Formula I

The compound of formula I (97 kg) in the form of a free acid is charged into a vessel dissolved in IPAC. The concentration of compound of formula I in IPAC was 179 mg/g.

The batch was then heated to 65° C. to dissolve the contents. Pumping around the recycle loop was initiated with the solution, and sonication was applied.

The batch was seeded with the microseed slurry.

Heptane (752.7 kg) was charged into the system over 26 hrs.

The batch was cooled to room temperature over time.

The batch was filtered and dried to provide the final product in crystalline form.

All patents, patent applications and publications cited herein are hereby incorporated by reference in their entirety. While the invention has been described and illustrated with reference to specific embodiments, numerous changes, modifications, and substitutions can be made therein without departing from the spirit and scope of the invention. It is intended therefore that the invention be limited only by the scope of the claims which follow and that such claims be interpreted as broadly as is reasonable.

What is claimed is:

1. A process for the production of substantially uniform crystalline particles of a compound of the formula I:

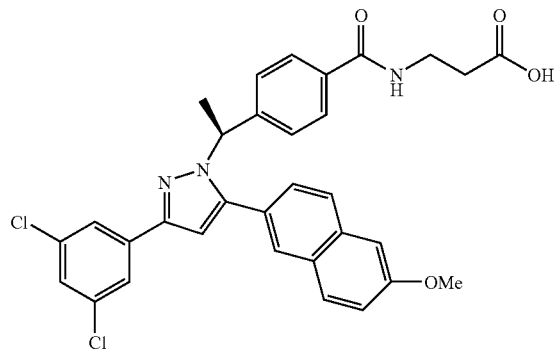

comprising:
generating microseeds of the compound of formula I, and crystallizing the compound of formula I on the microseeds from a suitable solvent or solvent mixture to produce the compound in the form of substantially uniform crystalline particles.

2. A process in accordance with claim 1 wherein the compound of formula is crystallized on the microseeds in the presence of ultrasonic energy.

3. A process in accordance with claim 1 wherein the mean particle size of the resulting crystalline particles is less than 60 μm.

4. A process in accordance with claim 1 wherein the mean size of the micro-seed is approximately 0.5 to 20 μm.

5. A process in accordance with claim 1 wherein the mean size of the micro-seed is approximately 1 to 10 μm.

6. A process in accordance with claim 1 wherein a media mill is utilized to generate the microseeds.

7. A process for the production of substantially uniform crystalline particles of a compound of the formula I:

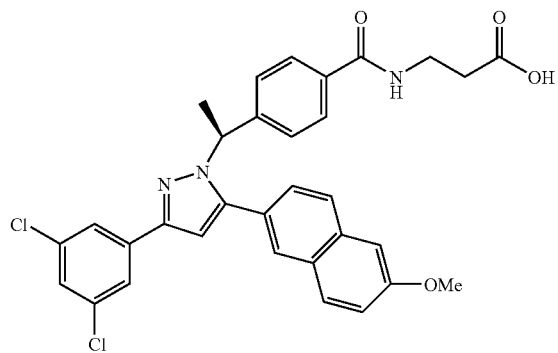

comprising:
(1) generating a slurry of micro-seeds;
(2) generating a solution of the compound of formula I to be crystallized in a suitable solvent;
(3) combining the product of step (1) and the product of step (2) in the presence of ultrasonic energy, and
(4) adding a suitable anti-solvent to cause crystallization of the compound of formula I.

8. A process in accordance with claim 7 wherein a recycle loop is utilized during the crystallization process.

9. A process in accordance with claim 7 wherein a supplemental energy device is utilized during the crystallization process.

10. A process in accordance with claim 9 wherein the supplemental energy device is a mixing tee, a mixing elbow, a static mixer, a sonicator, or a rotor stator homogenizer.

11. A process in accordance with claim 9 wherein the supplemental energy device is placed in a recycle loop.

12. A process in accordance with claim 11 wherein the crystallization process further comprises adding the microseeds, a batch solution, a reagent solution, or an antisolvent into a recycle loop or a region of high mixing intensity.

13. A process in accordance with claim 7 wherein the slurry of the micro-seeds and the solution of the compound of formula I are rapidly micro-mixed when they are combined.

14. A process in accordance with claim 1 wherein the resulting crystalline particles have a crystalline form that corresponds to the form of the micro-seeds.

* * * * *